(12) United States Patent
Uchimura et al.

(10) Patent No.: US 11,940,562 B2
(45) Date of Patent: Mar. 26, 2024

(54) SENSOR APPARATUS, ARTICLE DISPLAY SHELF, AND PRODUCTION MANAGEMENT SYSTEM

(71) Applicant: NEC Corporation, Tokyo (JP)

(72) Inventors: Jun Uchimura, Tokyo (JP); Hiroshi Takahashi, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 843 days.

(21) Appl. No.: 16/979,672

(22) PCT Filed: Feb. 22, 2019

(86) PCT No.: PCT/JP2019/006858
§ 371 (c)(1),
(2) Date: Sep. 10, 2020

(87) PCT Pub. No.: WO2019/181367
PCT Pub. Date: Sep. 26, 2019

(65) Prior Publication Data
US 2021/0025985 A1 Jan. 28, 2021

(30) Foreign Application Priority Data

Mar. 19, 2018 (JP) .................................. 2018-050908

(51) Int. Cl.
*G01S 7/481* (2006.01)
*A47F 5/00* (2006.01)
*G01S 17/88* (2006.01)

(52) U.S. Cl.
CPC .............. *G01S 7/4817* (2013.01); *A47F 5/00* (2013.01); *G01S 17/88* (2013.01)

(58) Field of Classification Search
CPC ........ G01S 7/4817; G01S 17/88; G01S 17/42; A47F 5/00; A47F 3/002; A47F 2010/025; G01V 8/14; G05B 19/418
See application file for complete search history.

(56) References Cited

U.S. PATENT DOCUMENTS

| 5,565,686 A | 10/1996 | Welch |
| 5,903,355 A | 5/1999 | Schwarz |
| 2006/0218057 A1* | 9/2006 | Fitzpatrick ............. G06Q 10/04 705/28 |

(Continued)

FOREIGN PATENT DOCUMENTS

| JP | S59-143982 A | 8/1984 |
| JP | S61-228594 A | 10/1986 |

(Continued)

OTHER PUBLICATIONS

English Translation of JP2016139306A Description (Year: 2016).*

(Continued)

*Primary Examiner* — Tarifur R Chowdhury
*Assistant Examiner* — Akbar H. Rizvi

(57) ABSTRACT

Provided is a sensor apparatus including: a laser ranging device that scans a predetermined scan range with a laser light such that at least a part of the emitted laser light passes through a region including a predetermined detection region; and a reflection mirror that reflects at least a part of the laser light to a direction not parallel to an incident direction and is provided so that the laser light occurring after reflection passes through the detection region.

19 Claims, 20 Drawing Sheets

(56) References Cited

U.S. PATENT DOCUMENTS

| | | |
|---|---|---|
| 2008/0259311 A1 | 10/2008 | Nara |
| 2009/0135013 A1 | 5/2009 | Kushida et al. |
| 2010/0208234 A1 | 8/2010 | Kaehler |
| 2011/0254928 A1 | 10/2011 | Meinherz |
| 2012/0274466 A1 | 11/2012 | Mezger |
| 2015/0186903 A1 | 7/2015 | Takahashi et al. |
| 2016/0370464 A1 | 12/2016 | Katsura et al. |
| 2018/0122235 A1* | 5/2018 | Hanks .................... G08G 1/162 |

FOREIGN PATENT DOCUMENTS

| | | |
|---|---|---|
| JP | S61-272676 A | 12/1986 |
| JP | H05-225471 A | 9/1993 |
| JP | 2006-029916 A | 2/2006 |
| JP | 2007-139648 A | 6/2007 |
| JP | 2008-268024 A | 11/2008 |
| JP | 2009-126660 A | 6/2009 |
| JP | 2010-151809 A | 7/2010 |
| JP | 2012-234527 A | 11/2012 |
| JP | 2013-052485 A | 3/2013 |
| JP | 2014-098603 A | 5/2014 |
| JP | 2015-143680 A | 8/2015 |
| JP | 2016-139306 A | 8/2016 |
| JP | 2017-009315 A | 1/2017 |

OTHER PUBLICATIONS

Japanese Office Action for JP Application No. 2018-050908, dated Jan. 19, 2023 with English Translation.

International Search Report for PCT Application No. PCT/JP2019/006858, dated May 21, 2019.

JP Office Action for JP Application No. 2018-050908, dated Aug. 23, 2022 with English Translation.

JP Office Action for JP Application No. 2018-050908, dated Jul. 18, 2023 with English Translation.

\* cited by examiner

SENSOR APPARATUS, ARTICLE DISPLAY SHELF, AND PRODUCTION MANAGEMENT SYSTEM

This application is a National Stage Entry of PCT/JP2019/006858 filed on Feb. 22, 2019, which claims priority from Japanese Patent Application 2018-050908 filed on Mar. 19, 2018, the contents of all of which are incorporated herein by reference, in their entirety.

TECHNICAL FIELD

The present invention relates to a sensor apparatus, an article display shelf, and a production management system.

BACKGROUND ART

Patent Literature 1 discloses an area monitoring system that monitors a monitoring target area by using laser light. The area monitoring system has a monitoring apparatus that emits laser light and a reflector that reflects the emitted laser light. The reflector has a function of reflecting the laser light emitted from the monitoring apparatus to the monitoring apparatus.

CITATION LIST

Patent Literature

PTL 1: Japanese Patent Application Laid-open No. 2017-9315

SUMMARY OF INVENTION

Technical Problem

In the area monitoring system disclosed in Patent Literature 1, a laser light emitted from the monitoring apparatus and a reflected light from the reflector pass through the same light path. Therefore, in Patent Literature 1, the light path through which these lights pass is limited on a line connecting the monitoring apparatus and the reflector, and this causes a limit in achieving higher functionality.

The present invention has been made in view of the problem described above and intends to provide a sensor apparatus with higher functionality and an article display shelf and a production management system having the sensor apparatus.

Solution to Problem

According to one example aspect of the present invention, provided is a sensor apparatus including: a laser ranging device that scans a predetermined scan range with a laser light such that at least a part of the emitted laser light passes through a region including a predetermined detection region; and a reflection mirror that reflects at least a part of the laser light to a direction not parallel to an incident direction and is provided so that the laser light occurring after reflection passes through the detection region.

Advantageous Effects of Invention

According to the present invention, it is possible to provide a sensor apparatus with higher functionality and an article display shelf and a production management system having the sensor apparatus.

DESCRIPTION OF EMBODIMENTS

Exemplary example embodiments of the present invention will be described below with reference to the drawings. Throughout the drawings, the same components or corresponding components are labeled with same references, and the description thereof may be omitted or simplified.

First Example Embodiment

Figure 1:
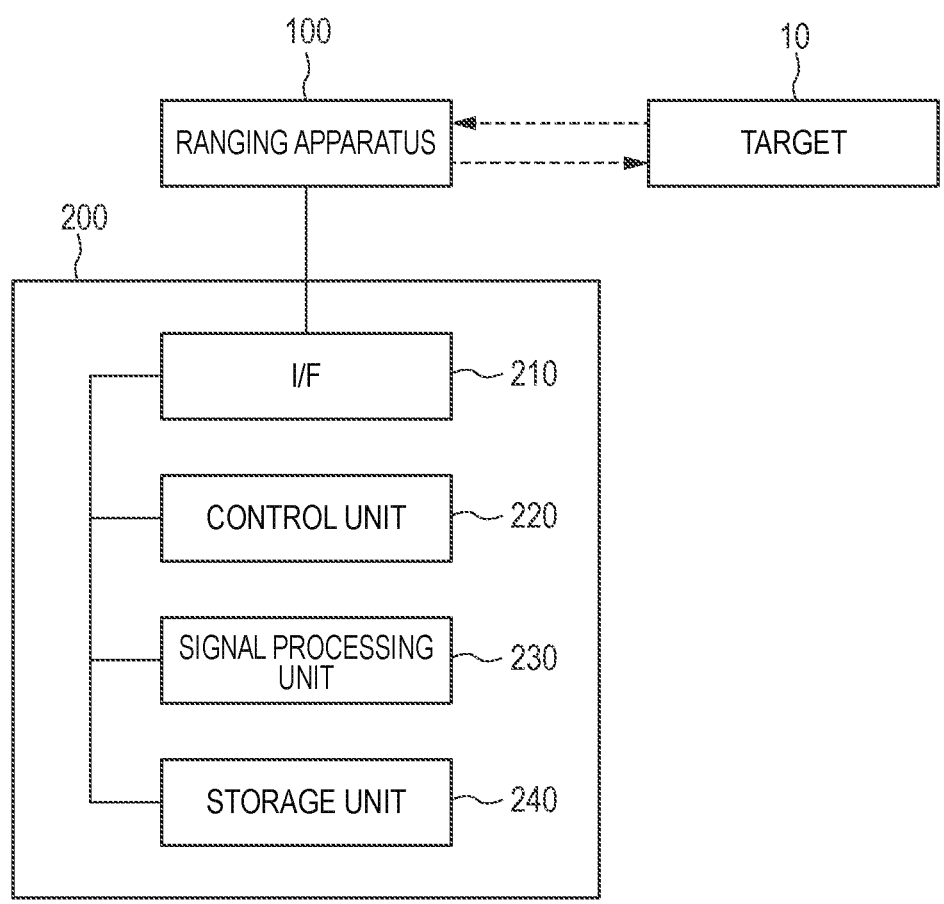
FIG. 1 is a schematic diagram illustrating a general configuration of an object detection system including a ranging apparatus according to a first example embodiment.

FIG. 1 is a schematic diagram illustrating a general configuration of an object detection system including a ranging apparatus 100 according to the present example embodiment. The object detection system includes the ranging apparatus 100 and a control apparatus 200.

The ranging apparatus 100 is an apparatus including a laser ranging device such as a Light Detection and Ranging (LiDAR) device, for example. The ranging apparatus 100 can acquire a distribution of the distance from the ranging apparatus 100 by emitting a light in a predetermined range and detecting a reflected light from a target 10. The ranging apparatus 100 may be referred to as a sensor apparatus in a more general sense. Although FIG. 1 illustrates a single ranging apparatus 100, the object detection system may be configured to have a plurality of ranging apparatuses 100. Note that, in the present specification, light is not limited to visible light but may include invisible light that cannot be viewed by a naked eye, such as an infrared ray, an ultraviolet ray, or the like.

The control apparatus 200 is a computer, for example. The control apparatus 200 has an interface (I/F) 210, a control unit 220, a signal processing unit 230, and a storage unit 240. The interface 210 is a device that connects the control apparatus 200 and the ranging apparatus 100 so as to be able to communicate with each other in a wired or wireless manner. Thereby, the control apparatus 200 and the ranging apparatus 100 are communicably connected to each other. The interface 210 may be a communication device based on the specification such as Ethernet (registered trademark), Wi-Fi (registered trademark), or the like, for example. The interface 210 may include a repeater device such as a switching hub. When the object detection system has a plurality of ranging apparatuses 100, the control apparatus 200 can control the plurality of ranging apparatuses 100 by relaying these ranging apparatuses 100 via a switching hub or the like.

The control unit 220 controls the operation of the ranging apparatus 100. The control unit 220 performs processing of control of a scan timing of the ranging apparatus 100, acquisition of measurement data, or the like. The signal processing unit 230 acquires distance information on an object such as the target 10 inside a detection region by processing a signal acquired from the ranging apparatus 100. Further, the signal processing unit 230 performs signal processing such as object detection inside a detection region, determination of the type of an object, determination of the motion direction of an object, generation of an image, or the like based on distance information.

The function of the control unit 220 and the signal processing unit 230 may be implemented when a processor such as a central processing unit (CPU), a graphics processing unit (GPU), or the like provided in the control apparatus 200 reads a program from a storage device and executes the program, for example. The storage unit 240 is a storage device that stores data acquired by the ranging apparatus 100, a program and data used in the operation of the control apparatus 200, or the like. Accordingly, the control apparatus 200 has a function of controlling the ranging apparatus 100 and a function of processing a signal acquired by the ranging apparatus 100.

The configuration of the object detection system described above is an example, and the object detection system may further include an apparatus that collectively controls the ranging apparatus 100 and the control apparatus 200. Further, the object detection system may be an integrated apparatus in which the function of the control apparatus 200 is incorporated in the ranging apparatus 100. The overall object detection system including the ranging apparatus 100 and the control apparatus 200 or the integrated apparatus having the functions of the ranging apparatus 100 and the control apparatus 200 may be referred to as a sensor apparatus in a more general sense.

Figure 2:
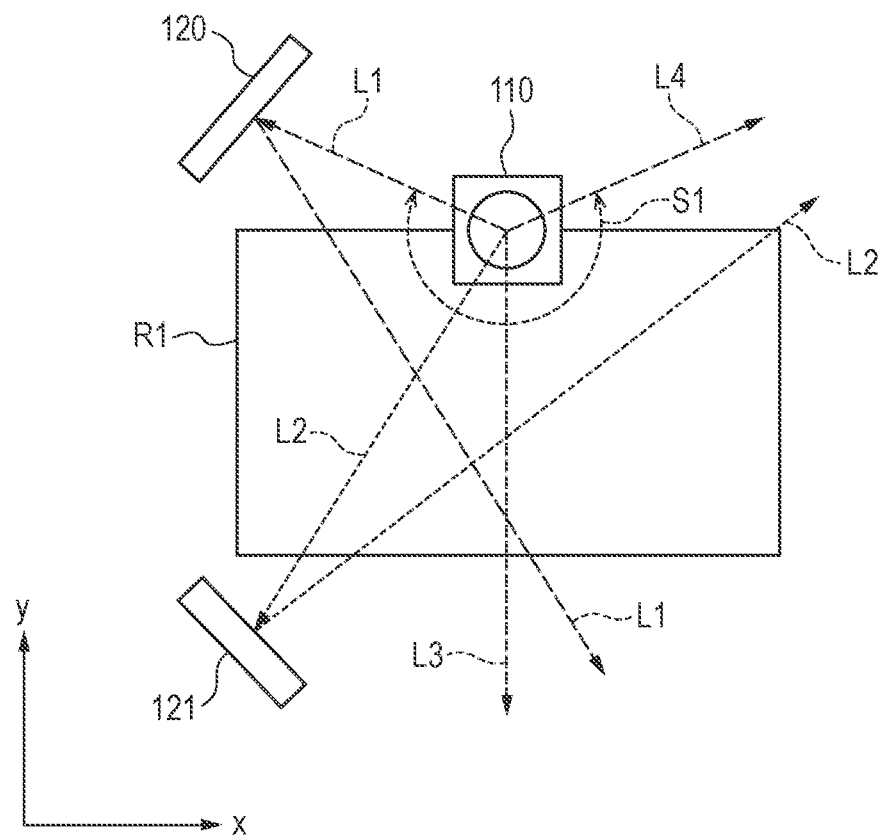
FIG. 2 is a schematic front view illustrating the structure of the ranging apparatus according to the first example embodiment.

FIG. 2 is a schematic front view illustrating the structure of the ranging apparatus 100 according to the present example embodiment. FIG. 2 illustrates the structure of the ranging apparatus 100 viewed from the positive direction of the z-axis that is a coordinate axis perpendicular to both the x-axis and the y-axis. Note that, in each drawing, axes of the right-handed coordinate system in which three axes of the x-axis, the y-axis, and the z-axis orthogonally intersect each other are employed. Further, the x-axis, the y-axis, and the z-axis illustrated in each drawing are solely provided for helping the description and are not intended to limit the arrangement direction of the ranging apparatus 100. The ranging apparatus 100 has a LiDAR device 110 used for detecting an object inside a detection region R1. The LiDAR device 110 has a laser light source used for emitting a laser light, a photoelectric conversion element that converts a received reflection light into an electrical signal, and a drive device used for scanning a ranging direction. As an example of a distance detection scheme performed by the LiDAR device 110, a Time Of Flight (TOF) scheme may be used. The TOF scheme is a method for measuring a distance by measuring a period from emission of a light to reception of a reflected light.

Note that the laser light emitted from the LiDAR device 110 may be visible light but may be invisible light such as an infrared ray. In a use of detection of an article being put in or taken out from an article display shelf described later or the like, it is desirable that the emission light be invisible light so as not to give discomfort to a user. The laser light may be an infrared ray having a wavelength of around 900 nm, for example.

The LiDAR device 110 performs a rotational scan within an angle range of a scan range S1 by rotating the laser light source and the photoelectric conversion element. That is, the LiDAR device 110 scans the scan range S1 with the laser light such that at least a part of the emitted laser light passes through a region including the detection region R1. The light paths L1, L2, L3, and L4 illustrated in FIG. 2 illustrate examples of light paths of a laser light emitted in various angles. The LiDAR device 110 acquires a distance while performing a rotational scan and thus is a device that acquires two-dimensional information of an angle and a distance and may also be referred to as a two-dimensional LiDAR device. Further, the LiDAR device 110 can acquire luminance information based on the intensity of laser light received at the photoelectric conversion element.

The signal processing unit 230 of the control apparatus 200 acquires position information on a target based on angle information at the time of a scan and distance information on a distance to a target that has reflected a laser light. Accordingly, the object detection system can detect the presence or absence of an object inside a detection region and the position of the object (target).

The detection region R1 may be set to the front of an opening of an article display shelf provided in a shop or the like, for example. In such a case, the LiDAR device 110 can detect customer's movement of putting his/her hand in the opening and taking out an article from the article display shelf or movement of returning the article. The information obtained by such detection may be used for missing-article management, theft detection, or the like in a shop. Note that, at this detection, a finger, a hand, an arm, or the like of a customer may be detected, or an article held by a hand of a customer may be detected.

Although the LiDAR device 110 is arranged at the center of the upper end of the detection region R1 in FIG. 2, the arrangement is not limited thereto, and the LiDAR device 110 may be arranged at the center on the side in the detection region R1, the center of the lower end of the detection region R1, four corners of the detection region R1, or the like, for example.

The ranging apparatus 100 further has reflection mirrors 120 and 121. Each of the reflection mirrors 120 and 121 has a reflection surface forming a plane. Because the reflection surfaces are planar, the relationship between the incident direction and the reflection direction of laser light is simplified, and light path design and analysis of data obtained by the ranging apparatus 100 are facilitated. Note that the shape of the reflection surface is not limited thereto and may be a convex plane or a concave plane. Further, the cross section of a reflection surface may be formed of a curve such as a part of a circle, a part of an ellipse, a part of a parabola, a part of a hyperbola, or the like, for example, and in such a case, optical design that makes use of the nature of these curves is possible.

The reflection mirror 120 reflects a laser light on a light path L1, which is emitted in a direction not passing through the detection region R1, in a direction not parallel to the incident direction. As illustrated in FIG. 2, the laser light reflected at the reflection mirror 120 passes through the detection region R1.

The reflection mirror 121 reflects a laser light on a light path L2, which is emitted in a direction passing through the detection region R1, in a direction not parallel to the incident direction. As illustrated in FIG. 2, the laser light reflected at the reflection mirror 121 passes through the detection region R1 again.

Although FIG. 2 illustrates that laser lights on light paths L3 and L4 are not reflected by the reflection mirrors 120 and 121, reflection mirrors that reflect the laser light so as to pass through the detection region R1 may be further provided as with the light paths L1 and L2.

Figure 3:
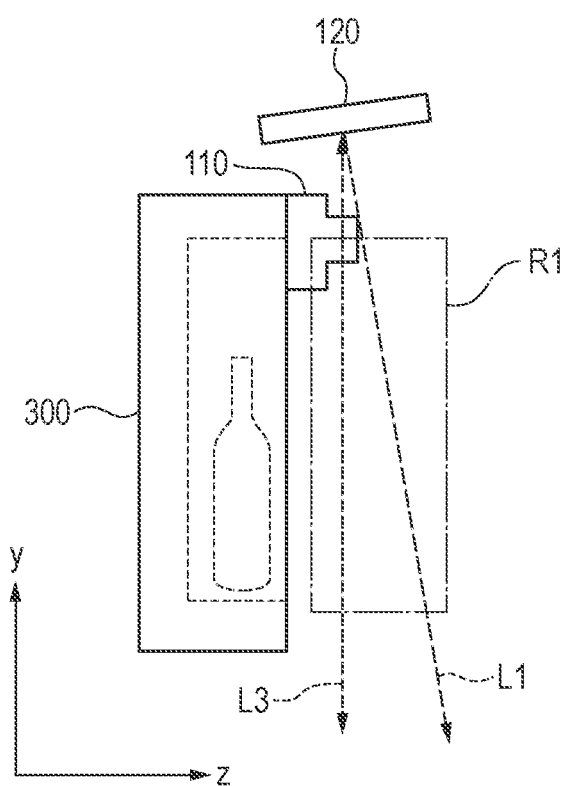
FIG. 3 is a schematic side view illustrating the structure of the ranging apparatus according to the first example embodiment.

FIG. 3 is a schematic side view illustrating the structure of the ranging apparatus 100 according to the present example embodiment. FIG. 3 illustrates the structure of the ranging apparatus 100 viewed from the negative direction of the x-axis. As illustrated in FIG. 3, the LiDAR device 110 is arranged on the top of an article display shelf 300. The article display shelf 300 has a shelf on which an article is displayed, and the front of the shelf forms an opening through which an article is put in and out. As illustrated in FIG. 3, the detection region R1 is arranged so as to traverse the front of the opening. Note that, in the schematic side view, illustration of a member not related to the description may be omitted.

As illustrated in FIG. 3, the reflection mirror 120 is arranged at an angle with respect to the light path L3 occurring before reflection. Thereby, the laser light occurring after reflection from the light path L1 passes through a different plane from the laser light occurring before reflection. With such arrangement, the light path L1 and the light path L3 become lines that pass on different planes.

Figure 4:
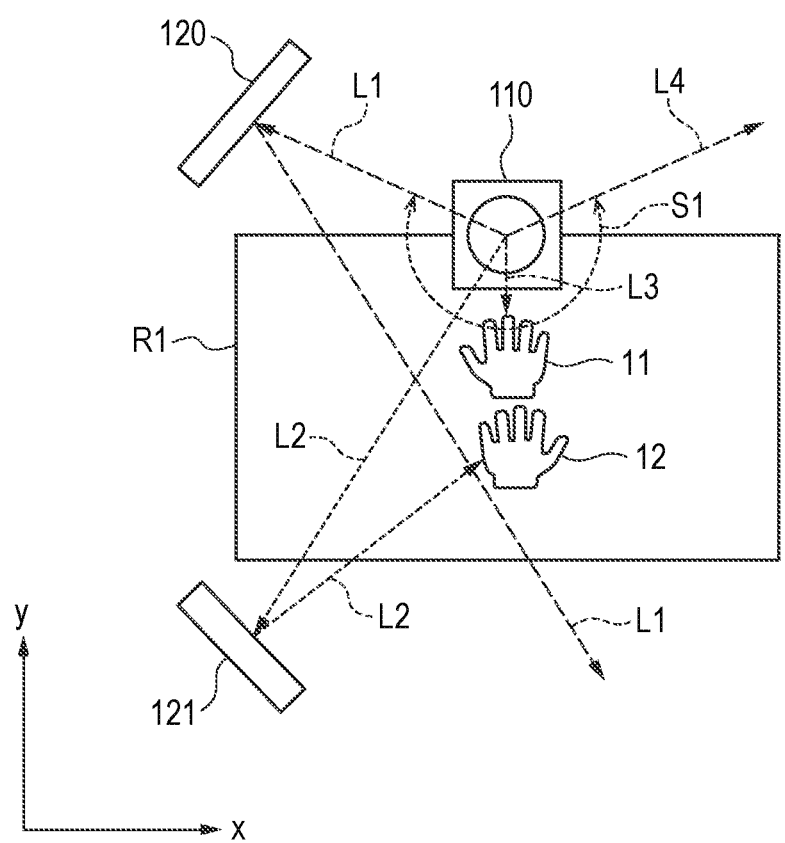
FIG. 4 is a diagram illustrating an example of object detection performed by the ranging apparatus according to the first example embodiment.
Figure 5:
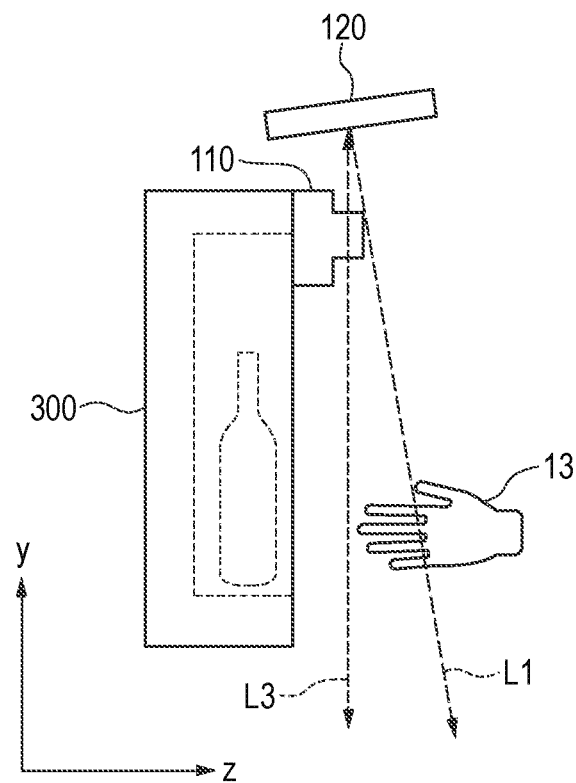
FIG. 5 is a diagram illustrating an example of object detection performed by the ranging apparatus according to the first example embodiment.

FIG. 4 and FIG. 5 are diagrams illustrating examples of object detection performed by the ranging apparatus 100 according to the present example embodiment. An object detection scheme performed by the ranging apparatus 100 of the present example embodiment will be described with reference to FIG. 4 and FIG. 5.

FIG. 4 illustrates an example of detection when a plurality of customers put their hands in the article display shelf 300 at the same time. In such a case, the customers' hands are targets to be ranged. FIG. 4 illustrates two targets 11 and 12.

The laser light emitted in the direction of the light path L3 from the LiDAR device 110 is reflected toward the LiDAR device 110 by the target 11. Thereby, the ranging apparatus 100 can detect the target 11. However, the laser light emitted in the direction of the light path L3 from the LiDAR device 110 is blocked by the target 11 and thus does not reach the target 12. In such a way, when a plurality of targets are present inside the detection region R1 at the same time such as when a plurality of customers put their hands in the article display shelf 300 at the same time, a target located in a shielded region may not be detected because the laser light is blocked by another target.

In contrast, the laser light emitted in the direction of the light path L2 from the LiDAR device 110 is reflected by the reflection mirror 121 and reaches the target 12. Accordingly, the ranging apparatus 100 can detect the target 12. Therefore, the ranging apparatus 100 of the present example embodiment can detect both the two targets 11 and 12.

In such a way, the ranging apparatus 100 of the present example embodiment is structured to cause the laser light to enter the detection region R1 from different directions by using the reflection mirrors 120 and 121. Thus, the laser light is less likely to be blocked by a target even when the plurality of targets 11 and 12 are present, and the likelihood of omission of detection can be reduced.

Further, the ranging apparatus 100 of the present example embodiment is structured so that a target may be irradiated with laser lights from different directions. Thus, distance information based on a plurality of laser lights can be acquired. Accordingly, detection accuracy may be improved.

FIG. 5 illustrates an example of detecting a motion direction of a hand put in the article display shelf 300 by a customer. Also in such a case, the hand of the customer is a target to be ranged. FIG. 5 illustrates a target 13. As described above, the light path L1 and the light path L3 pass on different planes. When the customer intends to take out an article and puts the hand in the article display shelf 300, the target 13 first traverses the light path L1 and then traverses the light path L3. Thus, the target 13 is detected based on the laser light that has passed through the light path L1, and the target 13 is then detected based on the laser light that has passed through the light path L3.

On the other hand, when the customer pulls the hand from the article display shelf 300 in order to take out an article, the target 13 first traverses the light path L3 and then traverses the light path L1. Thus, the target 13 is detected based on the laser light that has passed through the light path L3, and the target 13 is then detected based on the laser light that has passed through the light path L1.

The signal processing unit 230 of the control apparatus 200 can determine the temporal order of the detection timing based on the laser light that has passed through the light path L1 and the detection timing based on the laser light that has passed through the light path L3 and detect the motion direction of the target 13 based on this order. That is, the signal processing unit 230 functions as a motion direction detection means. The signal processing unit 230 can determine whether the customer is taking out an article from the article display shelf 300 or putting the article back to the article display shelf 300, for example, in accordance with the motion direction detection.

In such a way, the ranging apparatus 100 of the present example embodiment is structured to cause the laser light occurring after reflection to enter the detection region R1 so as to pass through a different plane from the laser light occurring before reflection by using the reflection mirrors 120 and 121. Thus, it is possible to detect the motion direction of the target 13 in accordance with the temporal order of detection based on the laser light occurring after reflection and detection based on the laser light occurring before reflection.

As described above, in the present example embodiment, it is possible to diversify the light path between the LiDAR device 110 and the targets 10 to 13 by using the reflection mirrors 120 and 121. Therefore, the ranging apparatus 100 having higher functionality is provided.

Further, as illustrated in FIG. 2, when the LiDAR device 110 having the scan range S1 exceeding 180 degrees is arranged at the end of the detection region R1, a part of the scan range S1 expands outside the detection region R1. However, even if the outside of the detection region R1 is scanned, such a scan is not useful for detection of a target inside the detection region R1 and may be wasted. In contrast, in the present example embodiment, since it is possible to turn the laser light emitted outside the detection region R1 back to the detection region R1 by using the reflection mirrors 120 and 121, it is possible to effectively use an extra scan range expanding outside the detection region R1.

Figure 6:
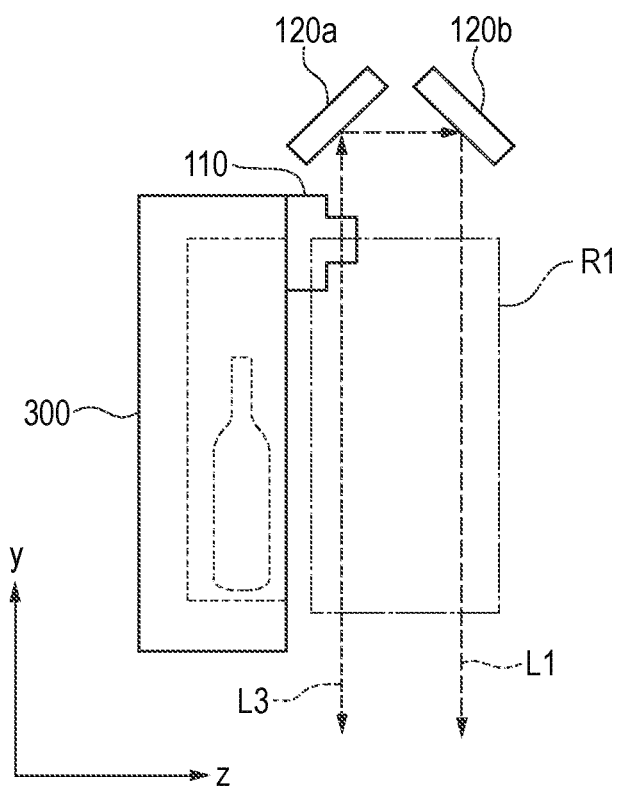
FIG. 6 is a schematic side view illustrating the structure of a ranging apparatus according to a modified example of the first example embodiment.

Next, a modified example of the first example embodiment will be described. FIG. 6 is a schematic side view illustrating the structure of the ranging apparatus 100 according to the modified example of the present example embodiment. The modified example of FIG. 6 is different from FIG. 3 in that a reflection mirror that reflects the laser light on the light path L1 is formed of two reflection mirrors 120a and 120b arranged perpendicularly to each other. As illustrated in FIG. 6, the laser light emitted from the LiDAR device 110 is reflected by the reflection mirror 120a to the right (z-axis positive direction) and then reflected by the reflection mirror 120b downward (y-axis negative direction). Thereby, in the detection region R1, a plane through which the light path L1 passes and a plane through which the light path L3 passes are parallel to each other.

According to the present modified example, a gap between the plane through which the light path L1 passes and the plane through which the light path L3 passes can be constant in the detection region R1. Therefore, detection accuracy of the motion direction of the target 13 is improved. Further, since it is possible to change the gap between the plane through which the light path L1 passes and the plane through which the light path L3 passes by appropriately setting the gap between the two reflection mirrors 120a and 120b, it is possible to design suitable light paths in accordance with an expected detection situation.

Second Example Embodiment

Next, a more specific configuration example of an article display shelf to which the ranging apparatus of the first example embodiment is applied will be described as a second example embodiment of the present invention. Description of components common to the first example embodiment will be omitted or simplified.

Figure 7:
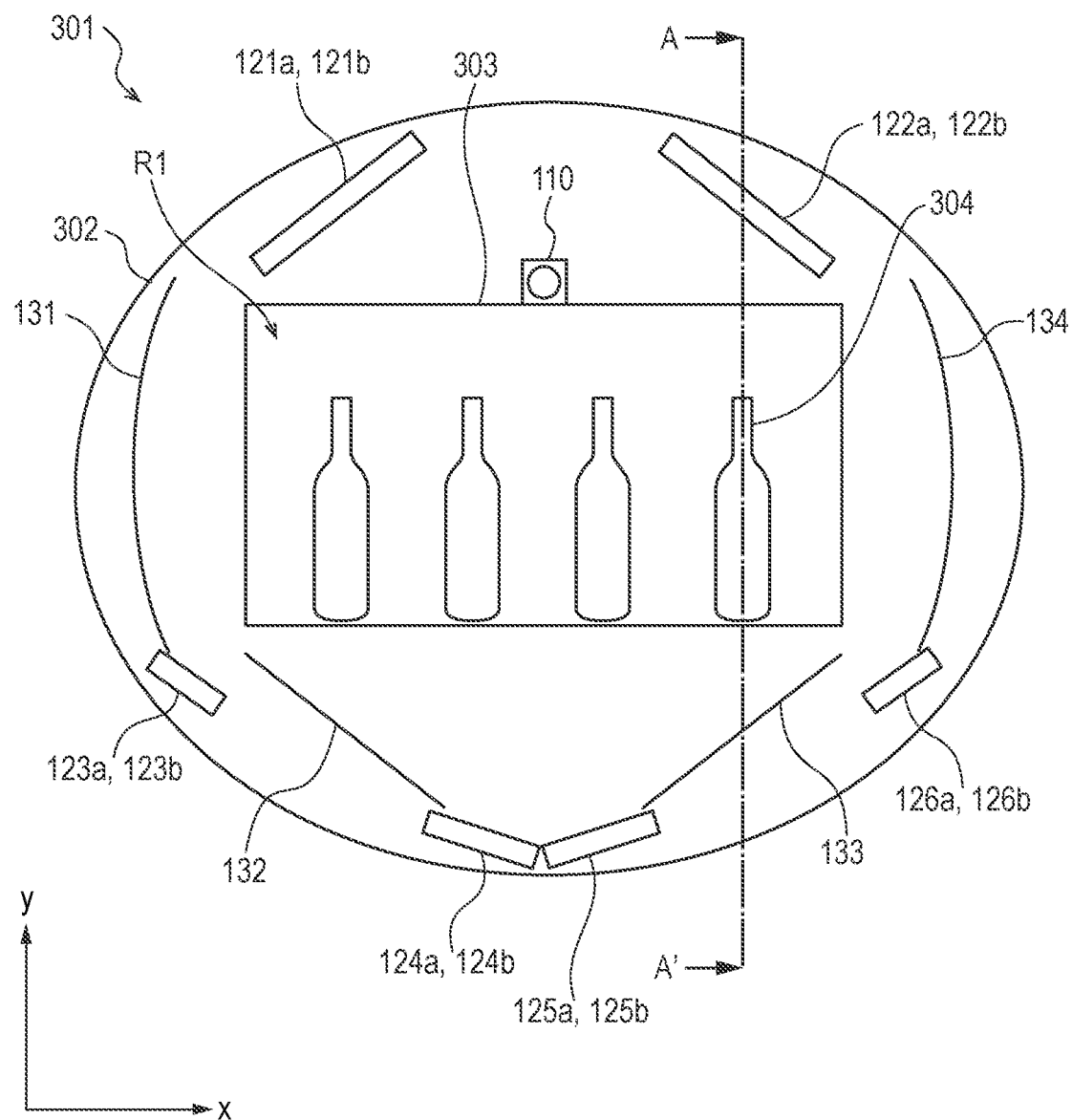
FIG. 7 is a schematic front view illustrating the structure of an article display shelf according to a second example embodiment.
Figure 8:
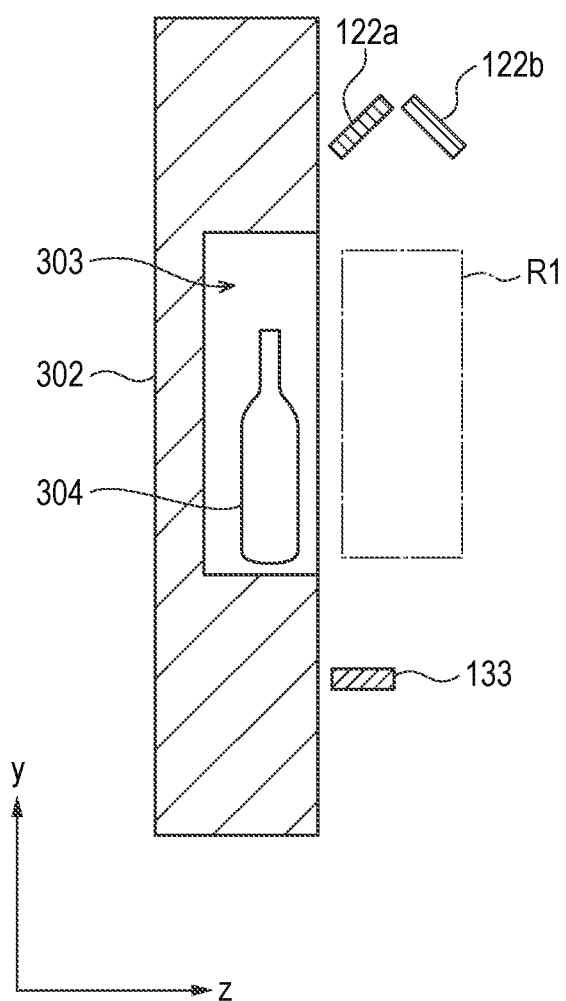
FIG. 8 is a schematic sectional view illustrating the structure of the article display shelf according to the second example embodiment.

FIG. 7 is a schematic front view illustrating the structure of the article display shelf 301 according to the present example embodiment, and FIG. 8 is a schematic sectional view of the article display shelf 301 in a cross section taken along a line A-A' of FIG. 7. The configuration of the article display shelf 301 will be described with reference to FIG. 7 and FIG. 8.

The article display shelf 301 has a shelf 302 and a plurality of reflection mirrors 121a to 126a, 121b to 126b, 131, 132, 133, and 134, and the LiDAR device 110 that are fixed to the shelf 302. A display portion 303 used for displaying articles 304 is provided in the shelf 302. An opening used for putting in and taking out the article 304 is provided in the display portion 303. The detection region R1 of the LiDAR device 110 is arranged in the opening. More specifically, the detection region R1 is arranged in a position such that the article 304 passes through the detection region R1 when the article 304 is put in and taken out.

The article display shelf 301 may be a product display shelf in which products sold in a shop are displayed, for example. In such a case, the article 304 may be a product. A customer visiting the shop selects the article 304 to purchase from the plurality of articles 304 displayed on the article display shelf 301 and takes out the selected article 304 from the opening in front of the display portion 303. The customer then carries the taken-out article 304 and moves to a payment place such as a cash register of the shop, makes payment of the price of the article 304, and completes a purchase procedure.

The reflection mirrors 121a to 126a, 121b to 126b, 131, 132, 133, and 134 are arranged so as to surround the display portion 303 in a front view as illustrated in FIG. 7. Although depicted as a single member in FIG. 7, the reflection mirrors 122a and 122b are formed of a pair of reflection mirrors 122a and 122b arranged perpendicularly to each other as illustrated in FIG. 8 in the actual implementation. The same applies to reflection mirrors 121a, 123a to 126a, 121b, and 123b to 126b.

Each of the reflection mirrors 121a to 126a, 121b to 126b, 132, and 133 has a reflection surface forming a plane. Each cross section of the reflection plane of the reflection mirrors 131 and 134 forms a part of an ellipse. Each of the reflection mirrors 131 and 134 using an elliptical plane has a nature of collecting light emitted from one focal point to the other focal point. Therefore, by arranging the LiDAR device 110 at the focal point of one of the reflection mirrors 131 and 134, it is possible to collect laser light to the other focal point, and this enables simplified light path design with high symmetry.

Figure 9:
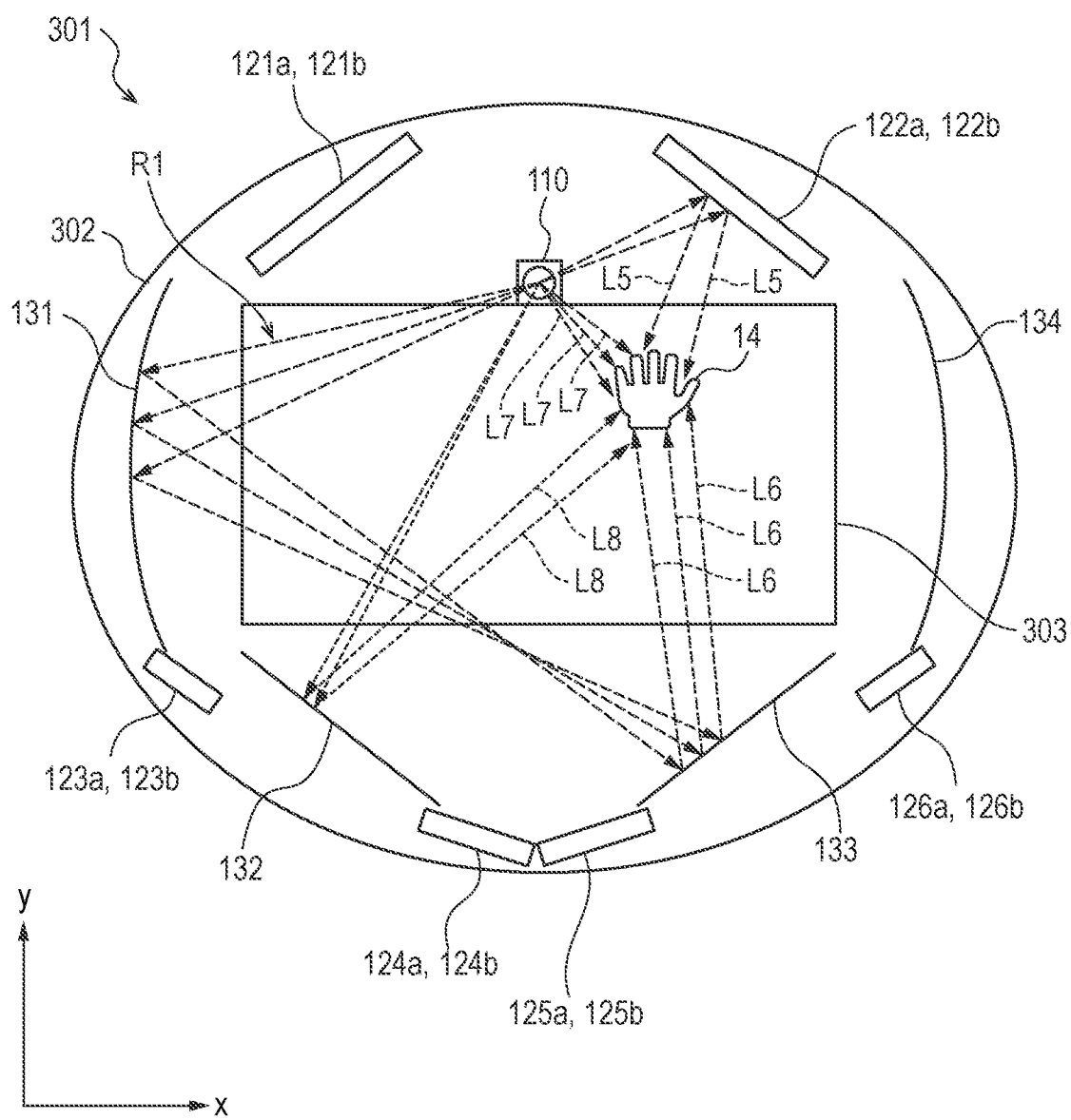
FIG. 9 is a schematic front view illustrating an example of object detection in the article display shelf according to the second example embodiment.
Figure 10:
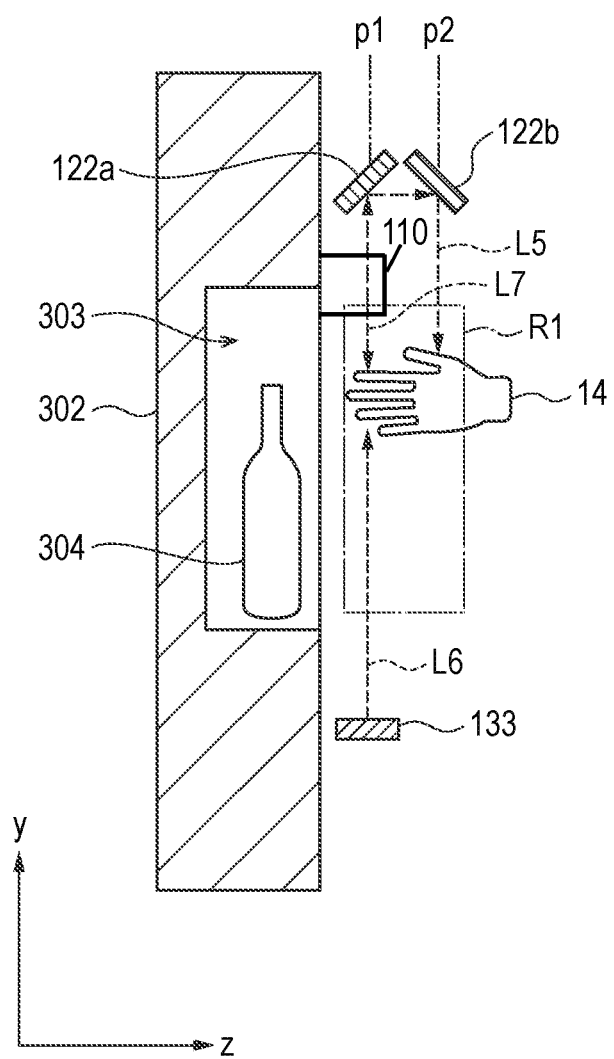
FIG. 10 is a schematic sectional view illustrating an example of object detection in the article display shelf according to the second example embodiment.

FIG. 9 is a schematic front view illustrating an example of object detection in the present example embodiment, and FIG. 10 is a schematic sectional view illustrating an example of object detection in a cross section taken along a line A-A' of FIG. 7. Light path design and object detection of the article display shelf 301 will be described with reference to FIG. 9 and FIG. 10.

FIG. 9 and FIG. 10 illustrate an example of detecting that a customer intends to take out the article 304 and puts the hand in the display portion 303 and detecting the motion direction when the hand is detected. In such a case, the hand of the customer is a target 14 to be ranged.

FIG. 9 illustrates four types of light paths L5, L6, L7, and L8 as an example as light paths of laser light emitted from the LiDAR device 110 and reaching the target 14. Details of respective light paths will be described with reference to FIG. 10 in addition. On the light path L5, the laser light emitted from the LiDAR device 110 to the outside of the detection region R1 is sequentially reflected by the reflection mirrors 122a and 122b, travels to the detection region R1, and reaches the target 14. Herein, the laser light before being reflected at the reflection mirror 122a passes through the detection plane p1 that is close to the article display shelf 301, and the laser light after being reflected by the reflection mirror 122b passes through a detection plane p2 that is more distant than the detection plane p1 from the article display shelf 301. Therefore, the laser light reaches the target 14 on the detection plane p2.

On the light path L6, the laser light emitted from the LiDAR device 110 to the inside of the detection region R1 is sequentially reflected by the reflection mirrors 131 and 133, travels to the detection region R1 again, and reaches the target 14. As illustrated in FIG. 10, the laser light reaches the target 14 on the detection plane p1. Note that the reflection mirror 131 has a reflection surface whose cross section forms a part of an ellipse, the LiDAR device 110 is provided at one of the focal points of the ellipse, and therefore the laser light reflected by the reflection mirror 131 converges at the other focal points. This enables light path design with high symmetry.

On the light path L7, the laser light emitted from the LiDAR device 110 to the inside of the detection region R1 reaches the target 14 without being reflected by any of the reflection mirrors. Also in such a case, the laser light reaches the target 14 on the detection plane p1, as illustrated in FIG. 10.

On the light path L8, the laser light emitted from the LiDAR device 110 to the inside of the detection region R1 is reflected by the reflection mirror 132 and reaches the target 14. Also in such a case, the laser light reaches the target 14 on the detection plane p1 in the same manner as in the case of the light path L6.

As described above, the laser light emitted from the LiDAR device 110 reaches the target 14 from a plurality of directions. Accordingly, in the same manner as in the first example embodiment, it is possible to reduce the likelihood of omission of detection due to the laser light being blocked by a target. Further, since the laser light reaches the target 14 on a plurality of detection planes, the signal processing unit 230 that functions as a motion direction detection means can detect the motion direction of the target 14 in the same manner as in the first example embodiment. Therefore, the signal processing unit 230 can determine whether the customer is taking out an article from the article display shelf 301 or putting the article back to the article display shelf 301.

As described above, in the present example embodiment, it is possible to diversify the light path between the LiDAR device 110 and the target 14 by using the reflection mirrors 121a to 126a, 121b to 126b, 131, 132, 133, and 134. In such a way, since the ranging apparatus 100 having higher functionality is realized, the article display shelf 301 that can accurately detect putting in and taking out of the article 304 is provided according to the present example embodiment.

In the example illustrated in FIG. 7, an ellipse is employed for the external shape of the shelf 302, and a rectangle is employed for the external shape of the display portion 303. However, these shapes are not limited to those depicted and can be appropriately changed in accordance with the design of the article display shelf 301.

Further, Although the LiDAR device 110 is arranged at the center of the upper end of the display portion 303 in FIG. 7, the arrangement is not limited thereto, and the LiDAR device 110 may be arranged at the center of the side of the display portion 303, the center of the lower end of the display portion 303, four corners of the display portion 303, or the like, for example. Further, although the LiDAR device 110 may be arranged at a position apart from the display portion 303, it is desirable that the LiDAR device 110 be provided at a position close to the display portion 303 in order to effectively use the scan range of the LiDAR device 110.

Third Example Embodiment

Next, a configuration example of a three-dimensional shape measurement apparatus to which the same scheme as that in the ranging apparatus of the first example embodiment is applied will be described as a third example embodiment of the present invention. Description of components common to the first example embodiment will be omitted or simplified. Note that a three-dimensional shape measurement apparatus may be referred to as a sensor apparatus in a more general sense.

Figure 11:
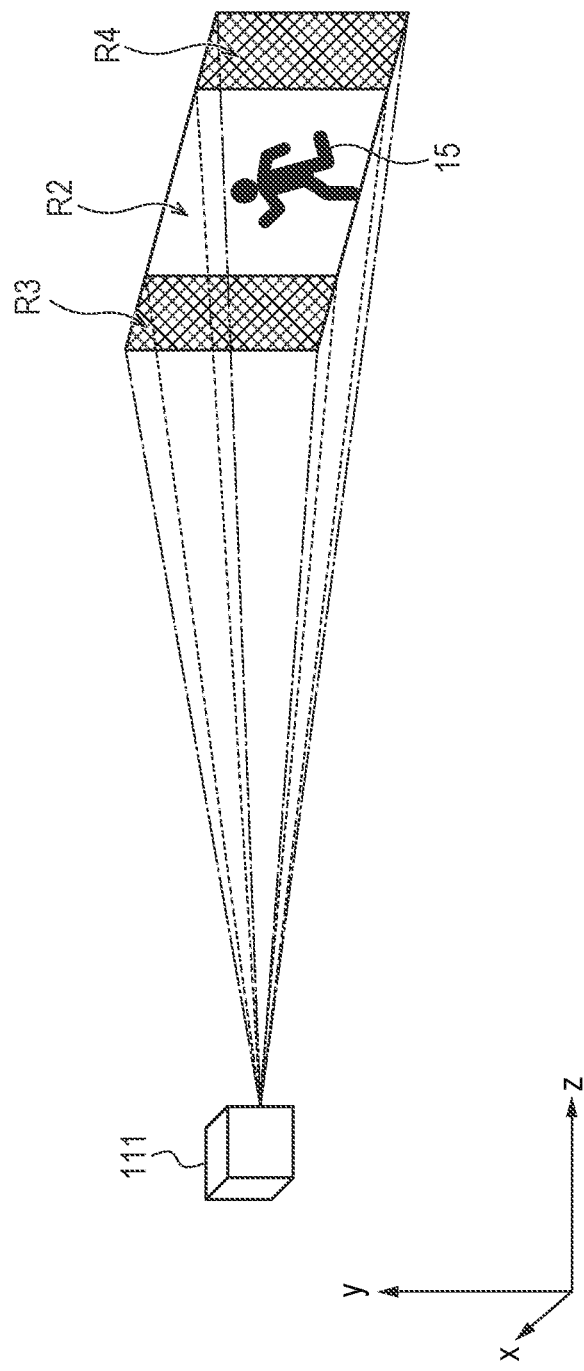
FIG. 11 is a schematic diagram illustrating an example of ranging using a three-dimensional LiDAR device used in a three-dimensional shape measurement apparatus according to a third example embodiment.

The three-dimensional shape measurement apparatus of the present example embodiment has a three-dimensional LiDAR device 111. First, the three-dimensional LiDAR device 111 will be described. FIG. 11 is a schematic diagram illustrating an example of ranging using the three-dimensional LiDAR device 111 used in the three-dimensional shape measurement apparatus according to the present example embodiment.

The three-dimensional LiDAR device 111 performs a two-dimensional scan in the x direction and the y direction in the drawings by rotating and moving a laser light source and a photoelectric conversion element. With such a scan, the three-dimensional LiDAR device 111 can measure the distance from the three-dimensional LiDAR device 111. Therefore, the three-dimensional LiDAR device 111 can obtain three-dimensional information in the x direction, the y direction, and the z direction. Further, the three-dimensional LiDAR device 111 can also acquire luminance information based on the intensity of laser light received by the photoelectric conversion element.

The three-dimensional LiDAR device 111 is configured to be able to scan a range of a detection region R2 and regions R3 and R4 illustrated in FIG. 11. In other words, the maximum angle of view of the three-dimensional LiDAR device 111 is within a range of the detection region R2 and the regions R3 and R4.

In the three-dimensional shape measurement apparatus in the present example embodiment, however, a range from which the luminance, a distance, or the like of a target 15 can be acquired is only the detection region R2. The laser light emitted to the angle of view of the three-dimensional LiDAR device 111 corresponding to the regions R3 and R4 is used for detection in the detection region R2 with a use of a reflection mirror. A specific configuration to implement such a detection scheme will be described with reference to FIG. 12.

Figure 12:
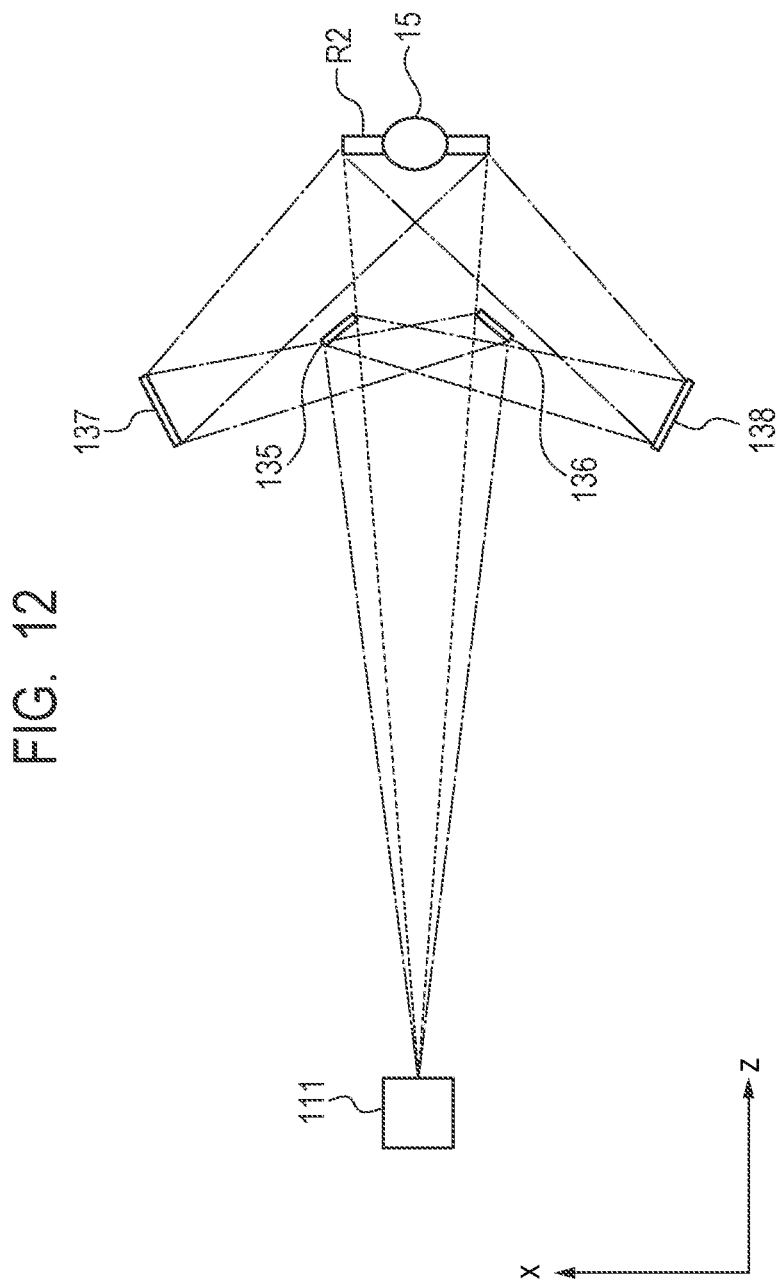
FIG. 12 is a schematic top view illustrating the structure of the three-dimensional shape measurement apparatus according to the third example embodiment.

FIG. 12 is a schematic top view illustrating the structure of the three-dimensional shape measurement apparatus according to the present example embodiment. The three-dimensional shape measurement apparatus has the three-dimensional LiDAR device 111 and reflection mirrors 135, 136, 137, and 138. The laser light emitted to the angle of view corresponding to the region R3 of the three-dimensional LiDAR device 111 is sequentially reflected by the reflection mirror 135 and the reflection mirror 138 and enters the detection region R2. Further, the laser light emitted to the angle of view corresponding to the region R4 of the three-dimensional LiDAR device 111 is sequentially reflected by the reflection mirror 136 and the reflection mirror 137 and enters the detection region R2. The laser light emitted to the angle of view corresponding to the detection region R2 of the three-dimensional LiDAR device 111 is not reflected by any of the reflection mirrors 135, 136, 137, and 138 and directly enters the detection region R2. In such a way, the laser lights that has passed through three types of light paths enter the detection region R2.

Figure 13:
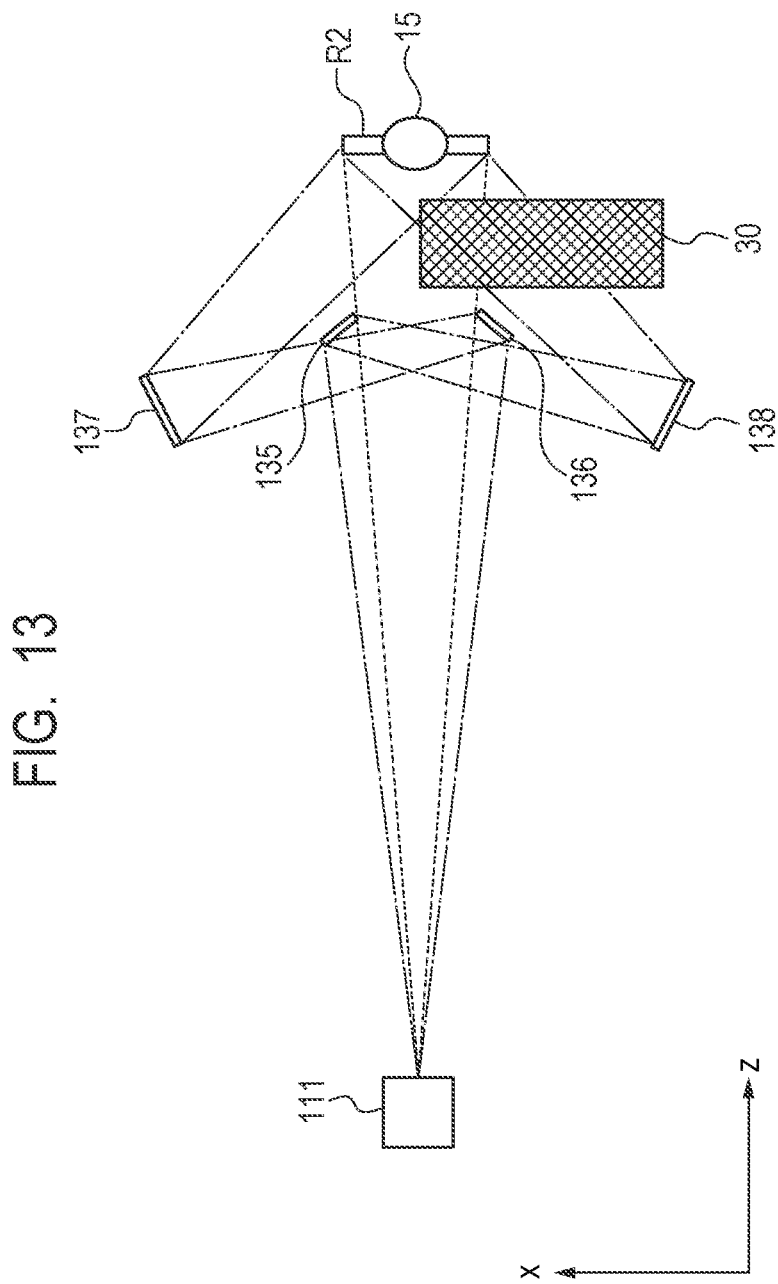
FIG. 13 is a schematic top view illustrating a case where a shield object is present in front of a detection region in the three-dimensional shape measurement apparatus according to the third example embodiment.
Figure 14A:
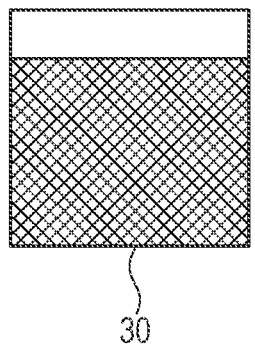
FIG. 14A is an example of an image acquired by the three-dimensional shape measurement apparatus according to the third example embodiment.
Figure 14B:
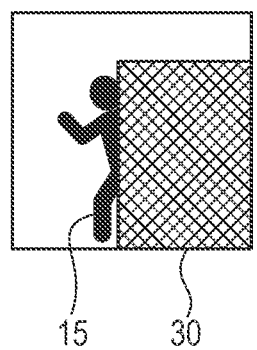
FIG. 14B is an example of an image acquired by the three-dimensional shape measurement apparatus according to the third example embodiment.
Figure 14C:
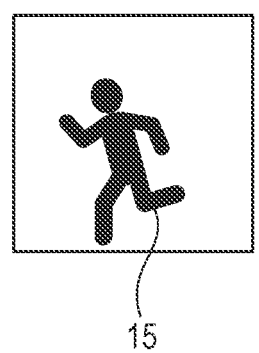
FIG. 14C is an example of an image acquired by the three-dimensional shape measurement apparatus according to the third example embodiment.

The advantage of employing the structure as described above will be described with reference to FIG. 13, FIG. 14A, FIG. 14B, and FIG. 14C. FIG. 13 is a schematic top view illustrating a case where a shield object 30 is present in front of a detection region in the three-dimensional shape measurement apparatus according to the present example embodiment. FIG. 14A, FIG. 14B, and FIG. 14C are examples of images acquired by the three-dimensional shape measurement apparatus according to the present example embodiment.

In FIG. 13, the shield object 30 is present between the reflection mirrors 135, 136, 137, and 138 and the detection region R2. This example assumes that an object such as a person, a car, or the like traverses between the reflection mirrors 135, 136, 137, and 138 and the detection region R2, for example. FIG. 14A, FIG. 14B, and FIG. 14C are examples of images measured by the three-dimensional shape measurement apparatus in such a case.

FIG. 14A is an example of an image acquired at an angle of view corresponding to the region R3 of the three-dimensional LiDAR device 111. In this light path, the shield object 30 is present between the reflection mirror 138 and the detection region R2, and substantially the overall range of the image is covered with the shield object 30. FIG. 14B is an example of an image acquired at an angle of view corresponding to the detection region R2 of the three-dimensional LiDAR device 111. In this light path, the shield object 30 is present in a part of the region between the three-dimensional LiDAR device 111 and the detection region R2, and the right half of the image is covered with the shield object 30. FIG. 14C is an example of an image acquired at an angle of view corresponding to the region R4 of the three-dimensional LiDAR device 111. In this light path, since the shield object 30 is not present between the reflection mirror 137 and the detection region R2, the shield object 30 is not present in the image, and the target 15 is detected.

As described above, the three-dimensional shape measurement apparatus of the present example embodiment causes the laser lights that has passed through a plurality of light paths to enter the detection region R2 at different angles. In other words, in the present example embodiment, it is possible to diversify the light path between the three-dimensional LiDAR device 111 and the target 15 by using the reflection mirrors 135, 136, 137, and 138. Accordingly, with the shape measurement by using a plurality of light paths, a blind area due to the shield object 30 is less likely to occur even in a measurement environment where the shield object 30 may be present, and a three-dimensional shape measurement apparatus having high functionality is provided.

Note that the images corresponding to FIG. 14A, FIG. 14B, and FIG. 14C are acquired in parallel by the control unit 220. The signal processing unit 230 performs, in parallel, first detection to detect the target 15 from the image corresponding to FIG. 14B and second detection to detect the target 15 from the image corresponding to FIG. 14A or FIG. 14C. In other words, the signal processing unit 230 functions as an object detection means that detects the target 15. In comparison between the first detection based on FIG. 14B and the second detection based on FIG. 14C, the target 15 can be detected better in the second detection where no blind area due to the shield object 30 occurs. Thus, in this example, the signal processing unit 230 compares a result of the first detection with a result of the second detection and adopts the result of the second detection.

To adopt a suitable result in comparison between the first detection and the second detection described above, the signal processing unit 230 also functions as a shield object distinguishing means that distinguishes between the target 15 and the shield object 30. The distinction of the shield object 30 may be performed based on a difference in the position of an object in the image of FIG. 14A, FIG. 14B, and FIG. 14C, for example. Since it is found from comparison between FIG. 14A, FIG. 14B, and FIG. 14C that the location of the shield object 30 is different in respective drawings having different scan ranges, it is possible to distinguish between the target 15 and the shield object 30.

Further, although distance information is not expressed in FIG. 14A, FIG. 14B, and FIG. 14C, distance information on each point of pixels forming an image is acquired in the actual implementation. Thus, the signal processing unit 230 may distinguish between the target 15 and the shield object 30 by comparing a distance to the object obtained by the first detection with a distance to the object obtained by the second detection.

Fourth Example Embodiment

Next, a configuration example of a production management system to which the same scheme as the ranging apparatus of the first example embodiment is applied will be described as a fourth example embodiment of the present invention. Description of components common to the first example embodiment will be omitted or simplified.

The production management system of the present example embodiment is a system that detects carrying in/out of a carriage in a production site such as an assembly factory. In the production site, a worker or a robot may push a carriage loaded with a component, a raw material, a semi-finished product, or the like and move between production lines. Thus, it is necessary to manage the position of a carriage within the production site, and there is a demand for a production management system that can detect carry in/out of a carriage. Note that the detection target in the production management system of the present example embodiment is not limited to a carriage and may be applied to transport apparatuses in general that transport an article. For example, a transport apparatus that is a detection target may be a self-driving unmanned carrier instead of a manually pushed carriage.

Figure 15:
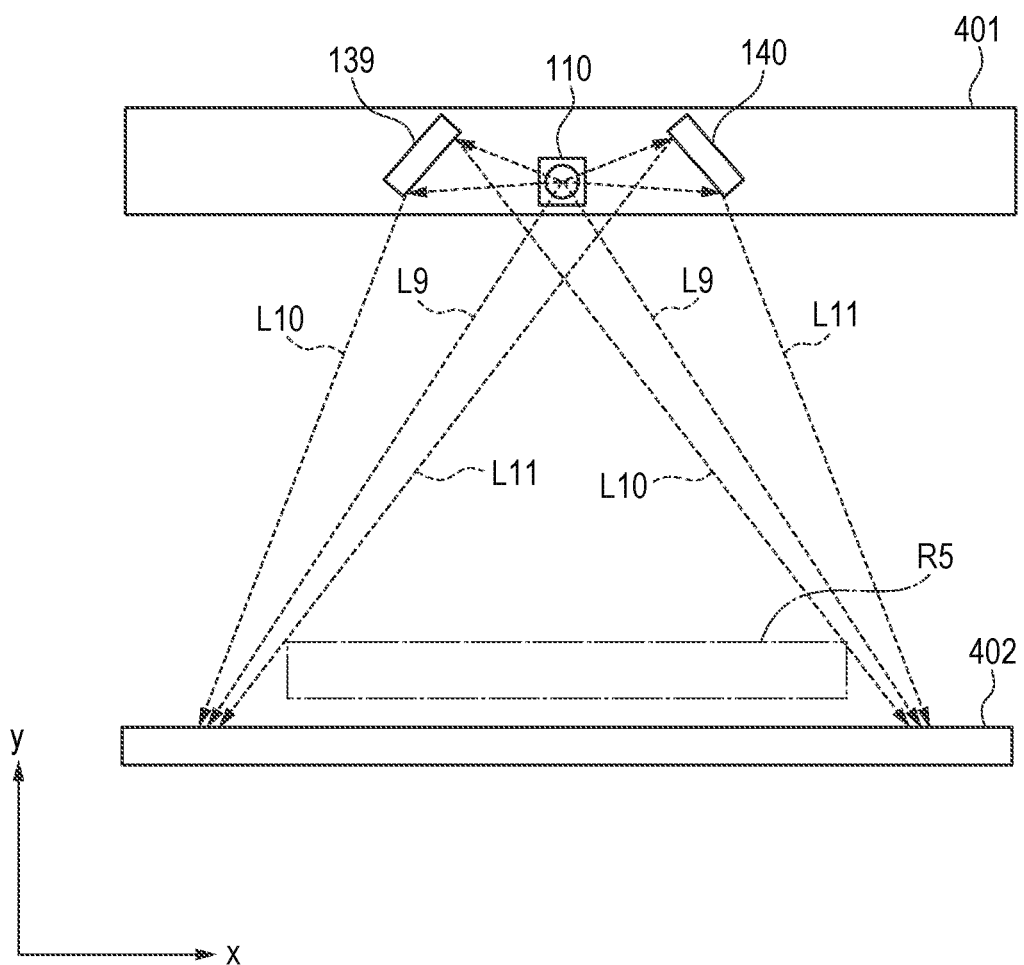
FIG. 15 is a schematic front view illustrating a configuration of a carriage detection mechanism in a production management system according to a fourth example embodiment.
Figure 16:
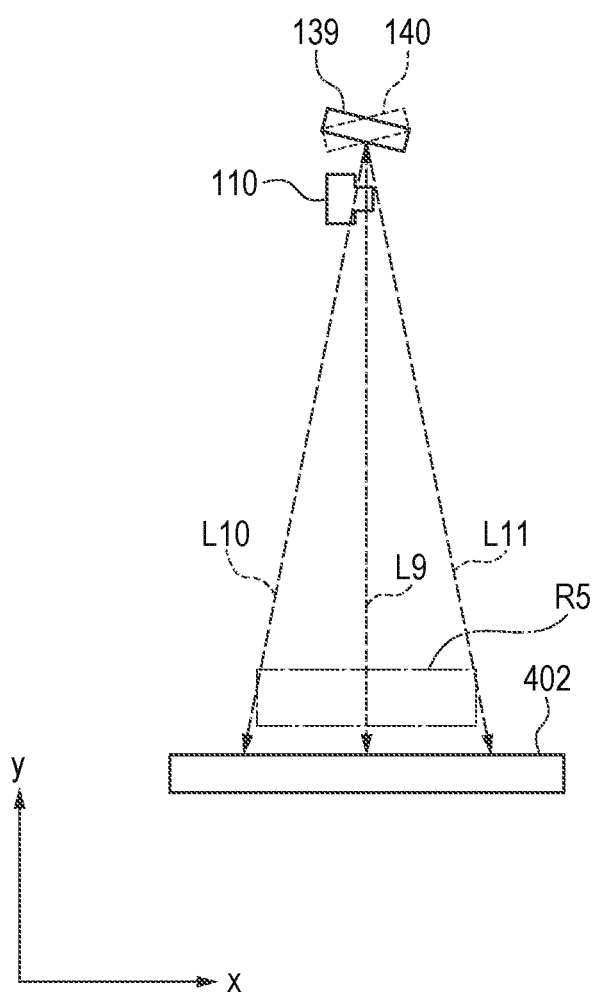
FIG. 16 is a schematic side view illustrating the configuration of the carriage detection mechanism in the production management system according to the fourth example embodiment.
Figure 17:
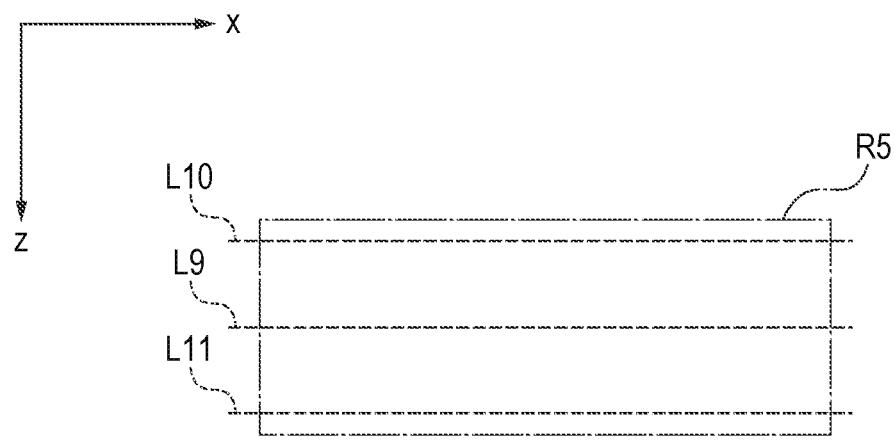
FIG. 17 is a schematic top view illustrating the configuration of the carriage detection mechanism in the production management system according to the fourth example embodiment.

The configuration of a carriage detection mechanism in the production management system of the present example embodiment will be described with reference to FIG. 15 to FIG. 17. FIG. 15 is a schematic front view illustrating the configuration of the carriage detection mechanism in the production management system according to the present example embodiment. FIG. 16 is a schematic side view illustrating the configuration of the carriage detection mechanism in the production management system according to the present example embodiment. FIG. 17 is a schematic top view illustrating the configuration of the carriage detection mechanism in the production management system according to the present example embodiment.

The carriage detection mechanism has the LiDAR device 110 and reflection mirrors 139 and 140. The LiDAR device 110 and the reflection mirrors 139 and 140 are attached to a ceiling beam 401 in the production site. The laser light emitted from the LiDAR device 110 passes through any of light paths L9, L10, and L11 and is emitted to a floor surface 402. Thereby, a detection region R5 used for detecting a carriage is formed near the floor surface 402. The detection region R5 is provided so as to include a region through which a carriage may pass. Note that the height of the detection region R5 may be around 10 cm above the floor surface 402, for example, taking the height of the carriage into consideration.

As illustrated in FIG. 15, the laser light emitted from the LiDAR device 110 to the floor surface 402 side on the light path L9 travels to the detection region R5 without being reflected by the reflection mirrors 139 and 140. The laser light emitted from the LiDAR device 110 to the ceiling beam 401 side on the light path L10 is reflected by the reflection mirror 139 and travels to the detection region R5. The laser light emitted from the LiDAR device 110 to the ceiling beam 401 side on the light path L11 is reflected by the reflection mirror 140 and travels to the detection region R5.

Further, as illustrated in FIG. 16, the reflection mirrors 139 and 140 are arranged inclined in different orientations from each other about the x-axis direction as a rotation axis. Thereby, the light paths L9, L10, and L11 pass through different surfaces. Therefore, the light paths L9, L10, and L11 form three detection lines shifted in the z-axis direction in the detection region R5 as illustrated in FIG. 16 and FIG. 17.

Figure 18:
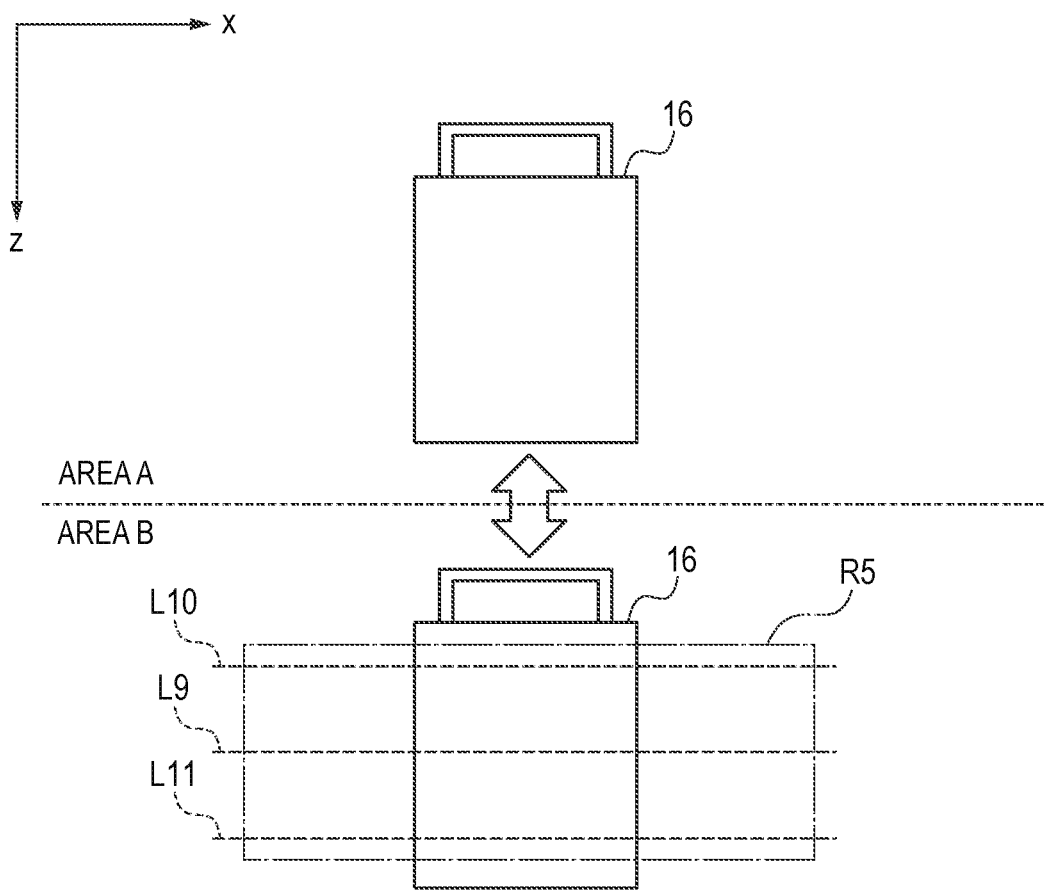
FIG. 18 is a schematic top view illustrating an example of carriage detection in the production management system according to the fourth example embodiment.

A specific example of carriage detection will be described with reference to FIG. 18 and FIG. 19. FIG. 18 is a schematic top view illustrating an example of the carriage detection in the production management system according to the present example embodiment. When a carriage 16 enters an area B including the detection region R5 from an area A outside the detection region R5, the carriage 16 enters three light paths in the order of the light path L10, the light path L9, and the light path L11. Contrarily, when the carriage 16 exits the area B to the area A, the carriage 16 exits the light path L11, the light path L9, and the light path L10 in this order.

As described above, the timings of detecting the carriage 16 on the light paths L9, L10, and L11 are different between the time of entry and the time of exit. Thus, the signal processing unit 230 of the control apparatus 200 can function as a motion direction detection means that detects the motion direction of the carriage 16 based on respective detection timings on the light paths L9, L10, and L11. Note that determination of the type as to whether an object that has traversed the light paths L9, L10, and L11 is the carriage 16 or another object may be performed based on the width in the x-axis direction in the drawings. For example, this determination algorithm may be an algorithm that, when an object having a width of several centimeters or larger is present at a position of a height of 10 cm from the floor surface 402, for example, determines the object as the carriage 16. In such a way, the signal processing unit 230 of the control apparatus 200 may also function as a type determination means that determines the type of an object.

Each use of the area A and the area B is not particularly limited as long as the area A and the area B are different from each other, and the area A may be a production area, and the area B may be a carriage storage area used for storing the carriage 16, for example. Alternatively, the area B may be a warehouse that stores components, raw materials, semi-finished products, or the like to be loaded on the carriage 16. In such cases, the production management system of the present example embodiment can manage entry and exit of the carriage 16 to and from the carriage storage area or the warehouse.

Figure 19:
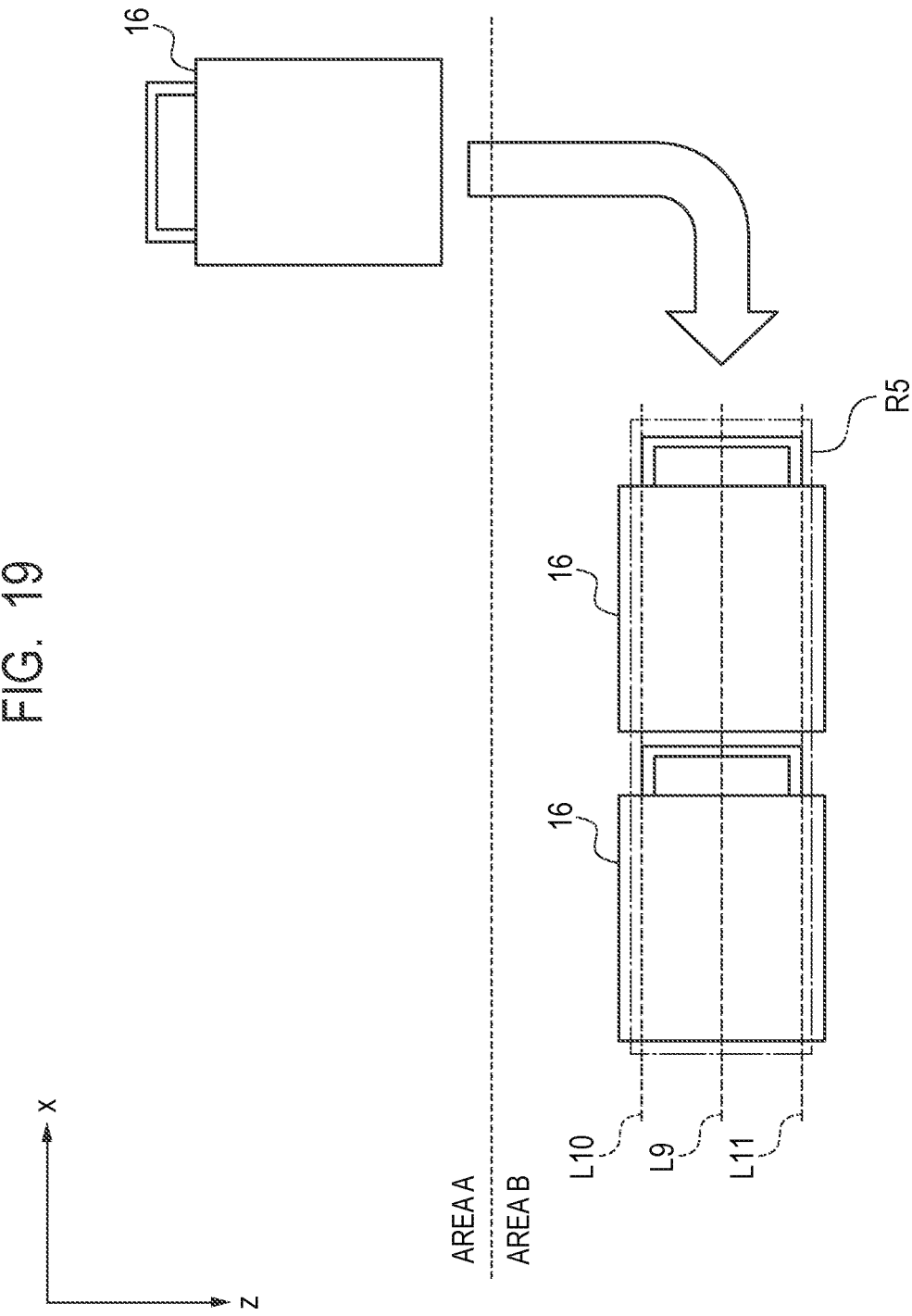
FIG. 19 is a schematic top view illustrating a modified example of carriage detection in the production management system according to the fourth example embodiment.

FIG. 19 is a schematic top view illustrating a modified example of the carriage detection in the production management system according to the present example embodiment. After entering the area B from the area A, the carriages 16 are arranged laterally inside the detection region R5. In the example of FIG. 19, two carriages 16 may be arranged inside the detection region R5. In the present modified example, two carriages 16 are detected on any of the light paths L9, L10, and L11. Accordingly, in the present modified example, when the detection results based on the light paths L9, L10, and L11 are the same, the signal processing unit 230 of the control apparatus 200 can determine that the object placed inside the detection region R5 is the carriage 16. In such a way, the signal processing unit 230 may also function as a type determination means that determines the type of an object. In such a case, since accuracy in detecting an object placed inside the detection region R5 is improved, the likelihood of erroneous detection can be reduced when an object other than the carriage is placed or the like.

Note that, in the modified example of FIG. 19, the signal processing unit 230 of the control apparatus 200 may further detect the position where the carriage 16 is placed or the like by performing detection on a plurality of regions divided in the x direction inside the detection region R5. In such a way, the signal processing unit 230 may also function as a position detection means that detects the position of an object. Note that, in such detection, a process for determining the number of carriages 16 when a plurality of carriages 16 are detected may be further added.

As described above, the production management system of the present example embodiment causes the laser lights that has passed through a plurality of light paths to enter the detection region R5 at different angles. In other words, in the present example embodiment, it is possible to diversify the light path between the LiDAR device 110 and the carriage 16, which is a target, by using the reflection mirrors 139 and 140. Accordingly, a production management system that realizes higher functionality such as detection of the motion direction of the carriage 16, improvement of accuracy in detecting the carriage 16, or the like is provided.

The apparatus or the like described in the above example embodiments may be configured as the following fifth example embodiment.

Fifth Example Embodiment

Figure 20:
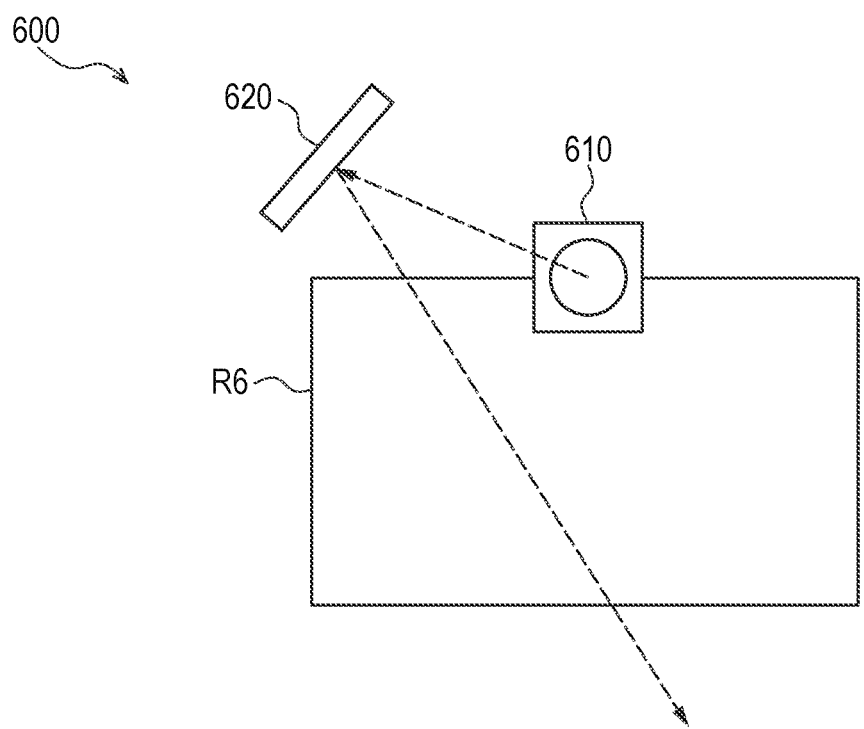
FIG. 20 is a schematic front view illustrating the structure of a sensor apparatus according to a fifth example embodiment.

FIG. 20 is a schematic front view illustrating the structure of a sensor apparatus 600 according to the fifth example embodiment. The sensor apparatus 600 has a laser ranging device 610 and a reflection mirror 620. The laser ranging device 610 scans a predetermined scan range with a laser light such that at least a part of an emitted laser light passes through a region including a predetermined detection region R6. The reflection mirror 620 reflects at least a part of the laser light to a direction not parallel to an incident direction. Further, the reflection mirror 620 is provided so that the laser light occurring after reflection passes through the detection region R6.

According to the present example embodiment, the sensor apparatus 600 with higher functionality is provided.

Modified Example Embodiment

The present invention is not limited to the example embodiments described above and can be changed as appropriate without departing from the spirit of the present invention.

The function of the control apparatus 200 described in the above example embodiments may be implemented as follows.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-read only memory (ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere embodied examples in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

A sensor apparatus comprising:
a laser ranging device that scans a predetermined scan range with a laser light such that at least a part of the emitted laser light passes through a region including a predetermined detection region; and
a reflection mirror that reflects at least a part of the laser light to a direction not parallel to an incident direction and is provided so that the laser light occurring after reflection passes through the detection region.

(Supplementary Note 2)

The sensor apparatus according to supplementary note 1, wherein in at least a part of the scan range, the laser light does not pass through the detection region before being reflected by the reflection mirror.

(Supplementary Note 3)

The sensor apparatus according to supplementary note 1 or 2, wherein the reflection mirror causes the laser light that has not passed through the detection region to pass through the detection region by reflection.

(Supplementary Note 4)

The sensor apparatus according to any one of supplementary notes 1 to 3, wherein the reflection mirror causes the laser light that has passed through the detection region to again pass through the detection region by reflection.

(Supplementary Note 5)

The sensor apparatus according to any one of supplementary notes 1 to 4, wherein the reflection mirror reflects the laser light by a reflection surface forming a plane.

(Supplementary Note 6)

The sensor apparatus according to any one of supplementary notes 1 to 4, wherein the reflection mirror reflects the laser light by a reflection surface forming a part of an ellipse.

(Supplementary Note 7)

The sensor apparatus according to any one of supplementary notes 1 to 6, wherein in the detection region, the laser light occurring after reflection passes through a different plane from the laser light occurring before reflection.

(Supplementary Note 8)

The sensor apparatus according to supplementary note 7 further comprising a motion direction detection means for detecting a motion direction of an object based on order of a timing of detecting the object by using the laser light occurring after reflection and a timing of detecting the object by using the laser light occurring before reflection.

(Supplementary Note 9)

The sensor apparatus according to supplementary note 7 or 8 further comprising a type determination means for determining a type of an object based on whether or not a result of detecting an object by using the laser light occurring after reflection and a result of detecting the object by using the laser light occurring before reflection are the same.

(Supplementary Note 10)

The sensor apparatus according to any one of supplementary notes 7 to 9 further comprising a position detection means for detecting the position of an object based on a position where the object in the scan range is detected.

(Supplementary Note 11)

The sensor apparatus according to any one of supplementary notes 1 to 10 further comprising an object detection means for performing first detection by using the laser light occurring before reflection and second detection by using the laser light occurring after reflection in parallel on an object.

(Supplementary Note 12)

The sensor apparatus according to supplementary note 11 further comprising a shield object distinguishing means for distinguishing a shield object from the object by comparing a distance to the object obtained by the first detection with a distance to the object obtained by the second detection.

(Supplementary Note 13)

The sensor apparatus according to supplementary note 11 further comprising a shield object distinguishing means for distinguishing a shield object from the object by comparing the scan range in the first detection with the scan range in the second detection.

(Supplementary Note 14)

An article display shelf comprising:
the sensor apparatus according to any one of supplementary notes 1 to 13; and
a display portion having an opening through which an article is taken out or put in,
wherein the sensor apparatus is configured such that the detection region is arranged in the opening.

(Supplementary Note 15)

A production management system comprising:
the sensor apparatus according to any one of supplementary notes 1 to 13,
wherein the detection region is provided so as to include a region through which a transport apparatus that transports an article passes.

This application is based upon and claims the benefit of priority from Japanese Patent Application No. 2018-050908, filed on Mar. 19, 2018, the disclosure of which is incorporated herein in its entirety by reference.

REFERENCE SIGNS LIST 10-15 target
16 carriage
30 shield object
100 ranging apparatus
110 LiDAR device
111 three-dimensional LiDAR device
120, 121 reflection mirror
121a-126a reflection mirror
121b-126b reflection mirror
131-140 reflection mirror
200 control apparatus
210 interface
220 control unit
230 signal processing unit
240 storage unit
300, 301 article display shelf
302 shelf
303 display portion
304 article
401 ceiling beam
402 floor surface
600 sensor apparatus
610 laser ranging device
620 reflection mirror
L1-L11 light path
p1, p2 detection plane
R1, R2, R5, R6 detection region
R3, R4 region
S1 scan range

The invention claimed is:

1. A sensor apparatus comprising:
a laser ranging device that scans a predetermined scan range with laser light such that at least a part of the laser light passes through a region including a predetermined detection region;
a reflection mirror that reflects at least a part of the laser light to a direction not parallel to an incident direction and is provided so that the laser light occurring after reflection passes through the detection region;
an object detector that performs first detection by using the laser light occurring before reflection by the reflection mirror and second detection by using the laser light occurring after reflection by the reflection mirror in parallel planes on an object; and
a shield object distinguisher that distinguishes a shield object from the object by comparing a distance to the object obtained by the first detection with a distance to the object obtained by the second detection.

2. The sensor apparatus according to claim 1, wherein in at least a part of the scan range, the laser light does not pass through the detection region before being reflected by the reflection mirror.

3. The sensor apparatus according to claim 1, wherein the reflection mirror causes the laser light that has not passed through the detection region to pass through the detection region by reflection.

4. The sensor apparatus according to claim 1, wherein the reflection mirror causes the laser light that has passed through the detection region to again pass through the detection region by reflection.

5. The sensor apparatus according to claim 1, wherein the reflection mirror reflects the laser light by a reflection surface forming a plane.

6. The sensor apparatus according to claim 1, wherein the reflection mirror reflects the laser light by a reflection surface forming a part of an ellipse.

7. The sensor apparatus according to claim 1, wherein in the detection region, the laser light occurring after reflection by the reflection mirror passes through a different plane from the laser light occurring before reflection by the reflection mirror.

8. The sensor apparatus according to claim 7 further comprising a motion direction detector that detects a motion direction of the object based on order of a timing of detecting the object by using the laser light occurring after reflection by the reflection mirror and a timing of detecting the object by using the laser light occurring before reflection by the reflection mirror.

9. The sensor apparatus according to claim 7 further comprising a type determiner that determines a type of an object based on whether or not a result of detecting the object by using the laser light occurring after reflection by the reflection mirror and a result of detecting the object by using the laser light occurring before reflection by the reflection mirror are the same.

10. The sensor apparatus according to claim 7 further comprising a position detector that detects a position of the object based on the position where the object in the scan range is detected.

11. A sensor apparatus comprising:
a laser ranging device that scans a predetermined scan range with laser light such that at least a part of the laser light passes through a region including a predetermined detection region;
a reflection mirror that reflects at least a part of the laser light to a direction not parallel to an incident direction and is provided so that the laser light occurring after reflection passes through the detection region;
an object detector that performs first detection by using the laser light occurring before reflection by the reflection mirror and second detection by using the laser light occurring after reflection by the reflection mirror in parallel planes on an object; and
a shield object distinguisher that distinguishes a shield object from the object by comparing the scan range in the first detection with the scan range in the second detection.

12. An article display shelf comprising:
the sensor apparatus according to claim 1; and
a display portion having an opening through which an article is taken out or put in, wherein the sensor apparatus is configured such that the detection region is arranged in the opening.

13. A production management system comprising:
the sensor apparatus according to claim 1,
wherein the detection region is provided so as to include a region through which a transport apparatus that transports an article passes.

14. The sensor apparatus according to claim 11, wherein in at least a part of the scan range, the laser light does not pass through the detection region before being reflected by the reflection mirror.

15. The sensor apparatus according to claim 11, wherein the reflection mirror causes the laser light that has not passed through the detection region to pass through the detection region by reflection.

16. The sensor apparatus according to claim 11, wherein the reflection mirror causes the laser light that has passed through the detection region to again pass through the detection region by reflection.

17. The sensor apparatus according to claim 11, wherein the reflection mirror reflects the laser light by a reflection surface forming a plane.

18. The sensor apparatus according to claim 11, wherein the reflection mirror reflects the laser light by a reflection surface forming a part of an ellipse.

19. The sensor apparatus according to claim 11, wherein in the detection region, the laser light occurring after reflection by the reflection mirror passes through a different plane from the laser light occurring before reflection by the reflection mirror.

* * * * *